Patented Mar. 11, 1952

UNITED STATES PATENT OFFICE 2,589,097

RETARDATION OF DEVELOPMENT OF REVERSION FLAVOR IN HYDROGENATED FATS AND OILS

Willy Lange, Cincinnati, and Robert G. Folzenlogen, Columbia Township, Ohio, assignors to The Procter and Gamble Company, Ivorydale, Ohio, a corporation of Ohio No Drawing. Application June 19, 1947, Serial No. 755,722

12 Claims. (Cl. 260—409)

The present invention relates to a process for delaying the development of an off-flavor, sometimes referred to as "reversion flavor," in certain hydrogenated glyceride oils on exposure to air.

So-called "reversion flavor" is characteristically developed by hydrogenated products derived from oils originally containing fatty radicals having more than two double bonds in non-conjugated position and is sometimes described as "beany" or "fishy" to distinguish it from the more familiar rancid flavor which may develop in fatty materials containing unsaturated carbon to carbon linkages.

It is known, for example, that oils containing combined linolenic acid, such as soybean oil, linseed oil, marine oils, and the like or mixtures containing appreciable proportions of same, when hydrogenated, such as to 70 to 80 iodine value, have limited use in the manufacture of edible products because of the characteristic tendency of the hydrogenated and deodorized products to develop reversion flavor on exposure to air. Notwithstanding published statements to the contrary, we have found that hydrogenation of such oils to lower iodine values does not eliminate this undesirable tendency and the development of the characteristic reversion flavor has been noted in soybean oil hydrogenated to iodine values as low as 24 for example. Even substantially completely hydrogenated soybean or linseed oils have been noted to develop a type of reversion flavor which is definitely associated with the presence of combined linolenic acid in the original oil.

Our work indicates that the formation of reversion flavor is the result of a series of chemical reactions. According to our belief, linolenic acid (or other fatty acid having more than two double bonds in non-conjugated position), present in the unhydrogenated, crude or refined oil in combined form, reacts with oxygen when exposed to air and, with the cooperation of another constituent or constituents of the oil, forms a compound which may be called a precursor of reversion flavor. This precursor, upon hydrogenation of the oil, is transformed into an odorless and flavorless product which when later exposed to oxygen finally forms compounds which are observed as reversion flavor. Only the hydrogenated form of precursor appears to develop this typical reversion flavor.

Many attempts have been made to delay the development of this type of off-flavor, but as far as we are aware none of the proposed processes has given results which are comparable to the process herein described.

It is therefore an object of the present invention to provide a process for improving the flavor stability of hydrogenated oils and fats which before hydrogenation contain combined fatty acids having more than two double bonds in non-conjugated position.

A more specific object is to provide a process for delaying the development of reversion flavor in hydrogenated oil such as hydrogenated soybean oil, linseed oil, rapeseed oil, marine oils and other oils which before hydrogenation contain combined linolenic acid and which after hydrogenation develop typical reversion flavor long before rancidity appears.

We have discovered that treatment of the alkali-refined and filtered, or alkali-refined, bleached and filtered oils with certain solids in finely divided form effects adsorption of the precursor which to a large extent can thereafter be removed by filtration and that if the treated and filtered oil is hydrogenated before it has had substantial contact with oxygen or an oxygen-containing gas, such as air, whereby additional precursor may be formed, then the hydrogenated product will have markedly greater stability against the development of reversion flavor.

In the practice of the invention the crude oil is alkali refined in the customary manner to remove free fatty acid and other precipitatable materials such as phosphatides and then is further purified by filtration, or by earth bleaching such as fuller's earth bleaching followed by filtration. This oil, in liquid condition and at a temperature which is not harmful, is intimately contacted with the certain solid material in particulate form in the substantial absence of oxygen as more fully hereinafter described, whereby previously formed constituents, which act as precursors and promote the development of reversion flavor after hydrogenation, are adsorbed or chemically changed and removed by subsequent filtration. The thus treated oil, before having substantial contact with oxygen or oxygen-containing gases, is then hydrogenated to the desired degree under the usual conditions designed to reduce the degree of unsaturation of the oil. The hydrogenated oil may thereafter be processed as by bleaching and deodorization to improve its qualities for edible purposes.

Solid materials which have been found suitable for the adsorption or removal of precursors are (1) activated aluminum oxide-containing materials such as activated alumina and activated bauxite, both being generically referred to in the claims as "activated alumina," (2) active aluminum silicate, (3) calcium hydroxide, (4) calcium oxide, and (5) zinc oxide.

Products sold commercially as activated alumina may be used successfully in our process. The method employed in the preparation and activation process does not appear critical and examples of methods of producing the product may be found in "Principles and Practice of Chromatography" by Zechmeister and Cholnoky, 1941, pp. 47–48, wherein the activation is effected by heating.

Bauxite, which contains hydrated alumina as the major component, may also be transformed by heating at about 1100° F. for example into an activated product which possesses properties very similar to those of activated alumina and which therefore may be used sucessfully in the practice of our process. Here again the temperature of heating is not critical but dehydration of the bauxite to a substantial degree is essential. Commercially available activated bauxite products in general fulfill this requirement and therefore may be satisfactorily employed.

Precipitated and dried aluminum silicate has adsorbent power for the material which ultimately develops reversion flavor in oils above identified, and may be used in the practice of this invention. This type of aluminum silicate adsorbent, prepared for example in accordance with U. S. Patent 2,174,177 to Kraybill, is herein identified as "active" aluminum silicate to distinguish it from acid activated clays, which have adsorbent power for coloring matter in oils and fats and therefore may be used in bleaching operations, but which do not have adsorbent power for the reversion flavor precursor and therefore are not operative in the practice of our invention.

In the employment of calcium hydroxide as the adsorbent material in the practice of our invention best results are obtained with products which do not contain an excess of moisture over the composition $Ca(OH)_2$.

Powdered calcium oxide and zinc oxide, being substantially water-free in available form, may be employed "as is" for adsorbing the precursor compound and effecting improvement in flavor stability of the hydrogenated oils.

The action of these adsorbent materials in effecting flavor stabilization is not fully understood. However, we do know that the effect of the practice is not simply one of removing colloidal matter from the oil because significant differences in light scatteration by treated and untreated oils are not apparent. Moreover, known bleaching treatments with activated bleaching earths do not improve the flavor stability as does the treatment with the above adsorbents in accordance with our invention.

The following examples and accompanying detailed description will more clearly indicate the manner in which our invention may be practiced, but it is to be understood that the specific limits and conditions set forth in the examples are given merely by way of illustration and are not to be considered as limiting the scope of the invention. Weight percentages are shown unless otherwise stated.

*Example 1.*—Crude soybean oil was alkali refined with 10% of 14° Baumé sodium hydroxide in the customary manner. The refined oil was decanted and mixed with 0.5% of diatomaceous earth and filtered. This oil was bleached with 2% bleaching earth at 140° F. To a portion of the refined and bleached oil at about 80° F. was added 5% of commercial activated alumina powdered to pass an 80 mesh screen. This mixture of oil and alumina was agitated at room temperature under a blanket of nitrogen for one hour. With the use of about 0.5% diatomaceous earth as a filter aid, the oil was filtered and promptly hydrogenated at 180° to 200° C., using 0.12% of nickel catalyst, until the iodine value of the hydrogenated oil was approximately 80. A similar sample of the oil was processed in exactly the same way except that the treatment with activated alumina was omitted. The hydrogenated oils were cooled to 60° C. under hydrogen, then mixed with a diatomaceous filter aid and filtered. These oils were again bleached at 60° C. for 10 minutes with 2% bleaching earth. Thereafter the bleached oils were steam deodorized for 2 hours at 200 to 210° C. under 2 mm. Hg pressure.

The effectiveness of the treatment herein employed to delay the development of off-flavor was determined by a controlled storage test wherein samples of the processed oils were stored in the dark at 90° F. in loosely covered, half filled 8 oz. jars. The samples were tested for flavor daily and a record was made of the number of weeks each product was so stored before development of reversion flavor.

In the case of that oil treated with activated alumina in accordance with this Example 1, no reversion flavor was noted until the oil had been stored for 6 weeks. The sample of that oil which was not subjected to the treatment with activated alumina developed a typical reversion flavor in one week.

A portion of the same soybean oil treated with 1% instead of 5% activated alumina and otherwise processed in the same way was stored for 4 weeks before reversion flavor was detected.

It is to be understood that the storage conditions herein used for determining relative flavor stability are more severe than those conditions most commonly encountered in normal handling of the product and of course off-flavors develop in a much shorter time. More specifically our work has indicated that flavor stabilities of one week and six weeks under the conditions of the test are equivalent to about 2 months and about 12 months respectively at about 80° F. in a closed container.

*Example 2.*—A quantity of refined and bleached soybean oil was dissolved in 5 volumes of petroleum ether and the solution at room temperature was passed through a tube 2 feet long and 2 inches in diameter filled with activated alumina powdered to pass an 80 mesh screen. The weight of the oil in solution was about 10 times the weight of alumina in the tube.

The petroleum ether was evaporated from the treated oil which was thereafter promptly hydrogenated and deodorized as in Example 1. Whereas the oil which was passed through the column of activated alumina required 6 weeks to develop reversion flavor when stored at 90° F. as described in Example 1, the same oil similarly processed except for this treatment with alumina developed an off-flavor in less than 2 weeks.

*Example 3.*—Refined and bleached soybean oil was mixed with 5% by weight of powdered calcium hydroxide, which had been ground to a particle size of about 60–100 mesh, and the mixture was agitated at room temperature under a blanket of nitrogen for one hour, then processed to a hydrogenated, deodorized oil as in Example 1. A sample of the thus treated oil was stored for 4 weeks at 90° F. before reversion flavor was detected, but a sample of oil processed similarly except for calcium hydroxide treatment developed reversion flavor in one week.

In auxiliary examples powdered calcium oxide, active aluminum silicate, and zinc oxide (about 60–100 mesh) were substituted for calcium hydroxide in Example 3. Marked improvements in flavor stability of the oil, in no case less than twice the flavor stability of the untreated oil, were noted.

*Example 4.*—In this example refined and bleached soybean oil was treated in accordance with Example 1 with 5% of a commercial, powdered (30–60 mesh) Arkansas bauxite which had been activated at 1100° F. This treatment almost doubled the flavor stability of the hydrogenated and deodorized oil.

*Example 5.*—Refined and bleached linseed oil was treated with 5% of commercial powdered activated alumina then hydrogenated and deodorized in accordance with the procedure of Example 1. The hydrogenated and deodorized oil had a flavor stability which was about twice that of the oil processed in a similar manner except for the treatment with activated alumina.

Substantially the same results were obtained when the same linseed oil was treated with powdered calcium hydroxide instead of powdered activated alumina.

*Example 6.*—Refined and bleached fish oil was treated with 5% of a commercial powdered activated alumina, then hydrogenated and deodorized in the manner shown in Example 1. The treated oil was stored as described above for 3 weeks before the development of the typical reversion flavor was detected. A similarly processed oil not subjected to the treatment with activated alumina developed a reversion flavor in less than one week.

We have observed, as previously indicated, that it is essential in the successful practice of the present invention to hydrogenate the refined and bleached oil promptly after treatment with the adsorbent material or before substantial contact with oxygen. Substantial exposure to light and air after the treatment and before hydrogenation causes the formation of additional precursor which ultimately develops reversion flavor in the hydrogenated oil, thereby tending to nullify the effect of the treatment with adsorbent. It is also preferable to minimize contact with oxygen during the treatment period, thus holding to a minimum the amount of precursor which must be adsorbed and removed in the treatment with the solid material.

The time of contact, which the treated oil may have with the air or other oxygen-containing gas before the effect of the treatment with adsorbent is substantially nullified, is dependent on the ratio of surface exposed to the volume of oil in process. Exposure of a thin film or a mist of the treated oil to air for a period of a few seconds before hydrogenation is usually sufficient to reduce significantly the stability of the oil toward the development of reversion flavor. Where large quantities are handled in bulk and only a portion of the treated oil is exposed to contact with oxygen, the overall net result as to reversion flavor development is intermediate between complete removal of precursor and no adsorption treatment by our invention. Best results and substantially complete freedom from reversion flavor development are of course, realized when the treated oil is handled in the complete absence of oxygen before hydrogenation.

The temperature at which the oils may be treated with the powdered adsorbent in accordance with our invention is not critical and may be varied over a wide range provided the oil is not harmed. Room temperatures such as 70 to 80° F. have been found quite suitable for the treatment. However, in order to facilitate filtration and separation of the solid adsorbent it may be advisable to elevate the temperature of the oil prior to filtration.

Lower viscosity of the oil occasioned by the use of higher temperatures also operates to advantage in that practice of our process wherein the oil is passed through a column or bed of the adsorbent, such procedure being adapted to batch or continuous operation. Of course, viscosity becomes less of a factor as the particle size of the adsorbent is increased, such as to 5 to 10 mesh, but under such conditions proportionately more adsorbent and longer times of contact are usually required to effect improvement in flavor stability.

In general the materials referred to herein as suitable adsorbents in the practice of our invention have an alkaline reaction in aqueous suspension, and the use of excessively high oil temperatures when contact is made with the solid adsorbent may cause saponification of the oil and the surface coating of the adsorbent with a layer of soap, thereby effecting a serious reduction in adsorptive power. Therefore, we have found it preferable to operate at oil temperatures not substantially higher than 140° F. when these adsorbents are used.

In Example 2 we have shown that the treatment of the oil with the solid adsorbent may be successfully accomplished by passing a solution of the oil in solvent through a column of the powdered adsorbent. In this modification of our invention also, temperature is not critical and because of the usual lowering of viscosity of the oil by solution in the solvent, contact with the adsorbent is facilitated. Other inert oil and fat hydrocarbon solvents than the petroleum ether used in Example 2 may be employed, pentane, hexane and benzene being exemplary.

In the examples we have shown the use of relatively finely powdered adsorbents for treatment of the particular oils in question. The degree of fineness of the powdered material is not critical and may be varied over a wide range. Obviously, however, it is desirable to have the adsorbent in a condition of fineness such that a large surface area per unit weight is available, thereby insuring intimate contact with every particle of oil, facilitating adsorption of the precursor and minimizing the amount required for effective flavor stabilization. The use of very finely powdered material, however, although efficient in the desired adsorptive action, may be impractical for the reason that it may be difficultly removable from the oil by filtration. Accordingly a degree of fineness must be chosen which permits both desired adsorption and filtration of the adsorbent material. We have found that material from 60 to 140 mesh is particularly suitable, although coarser and finer materials such as 40 and 200 mesh may be used where the facilities permit. The separation of extremely fine material by filtration can be facilitated by using about ½% diatomaceous filter aid after the treatment. Adsorbents of 5 to 10 mesh previously mentioned are not impractical but considerably greater usage is usually required to obtain desired flavor stabilization.

We have found that quantities of adsorbent material as low as 0.2 per cent based on the weight of the oil are effective in delaying the development of reversion flavor of oils herein identified. However, if larger amounts of adsorbent are used, a greater adsorbing area is obviously presented and the time of treatment may be correspondingly reduced. Thus the upper limit of adsorbent usage is determined by economic considerations and is not a critical factor in the realization of the objects of the present invention. Amounts varying from two to five per cent have been found to give excellent results, but quantities from 0.2 per cent to about ten per cent may be employed if desired.

Our work has indicated that the adsorbent treatment herein defined does not effectively reduce the tendency of the oil to develop reversion flavor after hydrogenation if practiced on the crude oil prior to alkali refining. We have noted that oils so treated develop reversion flavor in approximately the same time as untreated oils.

We have also observed that treatment of the alkali refined and hydrogenated oil does not appear to be effective in eliminating the hydrogenated form of precursor. Apparently the hydrogenated form is not readily adsorbed by the solid material and therefore there is little or no protection against the development of the reversion flavor.

The present invention may advantageously be applied to continuous operation wherein the refined and bleached oil is passed continuously through a column or bed, or series thereof, of the adsorbent material of suitable particle size, following which the treated oil is filtered and immediately passed to a continuous hydrogenation operation. Continuous hydrogenation procedures known in the art (see "The Hydrogenation of Organic Substances"—Ellis—1930) may be employed, and if desired, the oil may be subjected to such continuous treatment while dissolved in a hydrocarbon solvent, preferably one which has been freed from catalyst poisons.

Having thus described our invention, what we claim and desire to secure by Letters Patent is:

1. A process of retarding the development of reversion flavor in a revertible alkali refined, filtered, and hydrogenated fatty glyceride oil which before hydrogenation contains combined fatty acids with more than two double bonds in non-conjugated position, which comprises contacting the alkali refined and filtered liquid oil prior to hydrogenation and in the substantial absence of oxygen with at least one solid material in particulate form and of the group consisting of activated alumina, active aluminum silicate, calcium hydroxide, calcium oxide, and zinc oxide, separating said solid material from the treated oil, and hydrogenating the treated and separated oil before said oil has substantial contact with oxygen.

2. The process of claim 1 in which the amount of solid material is at least 0.2 per cent by weight of the oil treated.

3. The process of claim 2 in which the amount of solid material is from about 2 per cent to about 5 per cent of the oil treated.

4. The process of claim 1 in which the oil is dissolved in an inert hydrocarbon fat-solvent when contacted with the solid material in particulate form from 5 to 200 mesh in size.

5. The process of claim 1 in which the oil is passed continuously through a bed of the solid material in particulate form from 5 to 200 mesh in size.

6. The process of claim 5 in which the continuous adsorbent treatment is followed by continuous hydrogenation.

7. The process of claim 5 in which the oil is in solution in an inert hydrocarbon fat-solvent.

8. The process of claim 5 in which the oil is in solution in an inert hydrocarbon fat-solvent and the continuous adsorbent treatment is followed by continuous hydrogenation.

9. A process of retarding the development of reversion flavor in revertible hydrogenated oils originally containing combined linolenic acid, which comprises alkali refining the crude oil, removing filterable impurities, intimately contacting the resulting oil in liquid condition and in the substantial absence of oxygen with at least one solid material in particulate form and of the group consisting of activated alumina, active aluminum silicate, calcium hydroxide, calcium oxide, and zinc oxide, separating said solid material from the treated oil, and hydrogenating the treated and separated oil prior to substantial contact with oxygen.

10. A process of retarding the developement of reversion flavor in a revertible alkali refined, filtered, and hydrogenated fatty glyceride oil which before hydrogenation contains combined fatty acids with more than two double bonds in non-conjugated position, which comprises contacting the alkali refined and filtered liquid oil prior to hydrogenation and in the substantial absence of oxygen with activated alumina in particulate form, separating the treated oil from the alumina, and hydrogenating the treated oil before said oil has substantial contact with oxygen.

11. A process of retarding the development of reversion flavor in a revertible alkali refined, filtered, and hydrogenated fatty glyceride oil which before hydrogenation contains combined fatty acids with more than two double bonds in non-conjugated position, which comprises contacting the alkali refined and filtered liquid oil prior to hydrogenation and in the substantial absence of oxygen with active aluminum silicate in particulate form, separating the treated oil from the aluminum silicate, and hydrogenating the treated oil before said oil has substantial contact with oxygen.

12. A process of retarding the development of reversion flavor in a revertible alkali refined, filtered, and hydrogenated fatty glyceride oil which before hydrogenation contains combined fatty acids with more than two double bonds in non-conjugated position, which comprises contacting the alkali refined and filtered liquid oil prior to hydrogenation and in the substantial absence of oxygen with calcium hydroxide in particulate form, separating the treated oil from the calcium hydroxide, and hydrogenating the treated oil before said oil has substantial contact with oxygen.

WILLY LANGE.
ROBERT G. FOLZENLOGEN.

REFERENCES CITED

The following references are of record in the file of this patent:

UNITED STATES PATENTS

| Number | Name | Date |
|---|---|---|
| 1,247,516 | Ellis | Nov. 20, 1917 |
| 2,174,177 | Kraybill | Sept. 26, 1939 |
| 2,308,848 | Young et al. | Jan. 19, 1943 |
| 2,331,915 | Kirkpatrick | Oct. 19, 1943 |
| 2,353,229 | Durkee | July 11, 1944 |

OTHER REFERENCES

Hackh's "Chemical Dictionary," 1944 Ed., page 18, The Blakiston Co., Philadelphia, publishers.